United States Patent
Cardona et al.

(10) Patent No.: US 9,553,810 B2
(45) Date of Patent: *Jan. 24, 2017

(54) DYNAMIC RECONFIGURATION OF NETWORK DEVICES FOR OUTAGE PREDICTION

(71) Applicant: International Business Machines Corporation, Armonk, NY (US)

(72) Inventors: Omar Cardona, Cedar Park, TX (US); Rajarshi Das, Bangalore, IN (US); Nikhil Hegde, Round Rock, TX (US); Vishal R. Mansur, Hubli, IN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 592 days.

This patent is subject to a terminal disclaimer.

(21) Appl. No.: 14/077,312

(22) Filed: Nov. 12, 2013

(65) Prior Publication Data

US 2014/0269282 A1 Sep. 18, 2014

Related U.S. Application Data

(63) Continuation of application No. 13/835,422, filed on Mar. 15, 2013, now Pat. No. 9,172,646.

(51) Int. Cl.
*G06F 15/177* (2006.01)
*H04L 12/801* (2013.01)
(Continued)

(52) U.S. Cl.
CPC ............ *H04L 47/127* (2013.01); *H04L 41/147* (2013.01); *H04L 41/5025* (2013.01); *H04L 43/0888* (2013.01); *H04L 47/2408* (2013.01)

(58) Field of Classification Search
CPC ............ H04L 12/40176; H04L 41/5025; G06F 11/1425
(Continued)

(56) References Cited

U.S. PATENT DOCUMENTS 7,636,801 B1   12/2009 Kekre et al.
8,213,294 B2   7/2012 Arndt et al.
(Continued)

OTHER PUBLICATIONS

Wei, Yuan, et al.; Prediction-Based QoS Management for Real-Time Data Streams; Department of Computer Science; University of Virginia; 2006.
(Continued)

*Primary Examiner* — El Hadji Sall
(74) *Attorney, Agent, or Firm* — James L. Baudino

(57) ABSTRACT

According to one aspect of the present disclosure, a method and technique for dynamic reconfiguration of network devices for outage prediction is disclosed. The method includes: aggregating a plurality of network devices to form an input/output (I/O) link bundle; identifying a quality of service level of data throughput needed by at least one workload utilizing the I/O link bundle; monitoring a parameter of each of the network devices of the I/O link bundle; determining whether the monitored parameter indicates a predicted data throughout quality of service level decrease by a network device being utilized by the workload below the quality of service level for the workload; and responsive to determining that the monitored parameter indicates a predicted quality of service level decrease by the respective network device, dynamically reconfiguring the link bundle to maintain the quality of service level for the workload utilizing the I/O link bundle.

7 Claims, 5 Drawing Sheets

(51) Int. Cl.
*H04L 12/26* (2006.01)
*H04L 12/24* (2006.01)
*H04L 12/851* (2013.01)

(58) Field of Classification Search
USPC .......................................... 709/221, 224, 203
See application file for complete search history.

(56) References Cited

U.S. PATENT DOCUMENTS

2005/0021936 A1  1/2005 Bailey et al.
2012/0180048 A1  7/2012 Brownlow et al.

OTHER PUBLICATIONS

Malek, Miroslaw; Tutorial on Predictive Algorithms and Technologies for Availability Enhancement; International Service Availability Symposium; University of Tokyo, Tokyo, Japan; May 19, 2008.
Salfner, Felix, at al.; A Survey of Online Failure Prediction Methods; ACM Comput. Surv.; vol. 42, No. 3; pp. 1-68; Mar. 2010.
Zeng, Liangzhao, et al.; Event-Driven Quality of Service Prediction; Service-Oriented Computing—ICSOC 2008, vol. 5364 of Lecture Notes in Computer Science; pp. 147-161; 2008.

DYNAMIC RECONFIGURATION OF NETWORK DEVICES FOR OUTAGE PREDICTION

BACKGROUND

A network device and/or input/output (I/O) adapter is used to control data flow between different devices (e.g., between a client and a server). These devices are generally configured to receive and transmit data between devices based on the operational characteristics of the network device. These network devices generally include ingress and egress queues for data transmission/receive requests, along with data buffers form buffering data that is to be transmitted or that has been received. In some instances, network congestion may affect data throughput on the network device. For example, data may be lost if data packets are received at a rate faster than the network device can transmit the data packets onto a bus of a corresponding data processing system. In other instances, consecutive bursts of large data packets may impact data throughput (incoming or outgoing). Network devices are generally configured having various flow control features to adapt to such congestion (e.g., pause frames may be issued to a source device to suspend data transmissions for some period of time).

BRIEF SUMMARY

According to one aspect of the present disclosure a method and technique for dynamic reconfiguration of network devices for outage prediction is disclosed. The method includes: aggregating a plurality of network devices to form an input/output (I/O) link bundle; identifying a quality of service level of data throughput needed by at least one workload utilizing the I/O link bundle; monitoring a parameter of each of the network devices of the I/O link bundle; determining whether the monitored parameter indicates a predicted data throughout quality of service level decrease by a network device being utilized by the workload below the quality of service level for the workload; and responsive to determining that the monitored parameter indicates a predicted quality of service level decrease by the respective network device, dynamically reconfiguring the link bundle to maintain the quality of service level for the workload utilizing the I/O link bundle.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
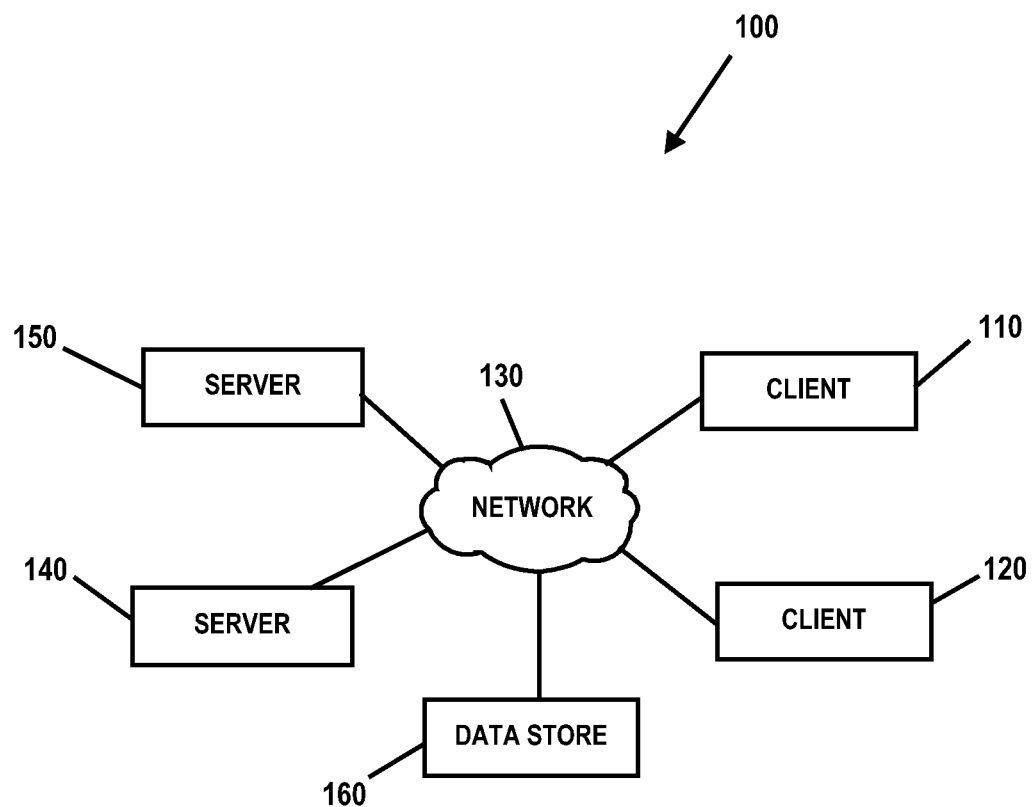
FIG. 1 is an embodiment of a network of data processing systems in which the illustrative embodiments of the present disclosure may be implemented.

Embodiments of the present disclosure provide a method, system and computer program product for dynamic reconfiguration of network devices for outage prediction. For example, in some embodiments, the method and technique includes: aggregating a plurality of network devices to form an input/output (I/O) link bundle; identifying a quality of service level of data throughput needed by at least one workload utilizing the I/O link bundle; monitoring a parameter of each of the network devices of the I/O link bundle; determining whether the monitored parameter indicates a predicted data throughout quality of service level decrease by a network device being utilized by the workload below the quality of service level for the workload; and responsive to determining that the monitored parameter indicates a predicted quality of service level decrease by the respective network device, dynamically reconfiguring the link bundle to maintain the quality of service level for the workload utilizing the I/O link bundle. Thus, embodiments of the present disclosure enable dynamic and/or real-time reconfiguration of network devices and/or an aggregated link bundle before the occurrence of an outage/event that may cause the data throughput QoS level by a network device to decrease below a level needed to support system/application requirements. For example, in some embodiments, one or more operating attributes/parameters of each of the bundled network devices is monitored and/or analyzed to determine whether the attribute/parameter value indicates an impending outage/QoS level decrease. If so, the link bundle and/or respective network device may be reconfigured dynamically and/or in real-time transparently to a user and/or workload before such outage/QoS level decrease occurs.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
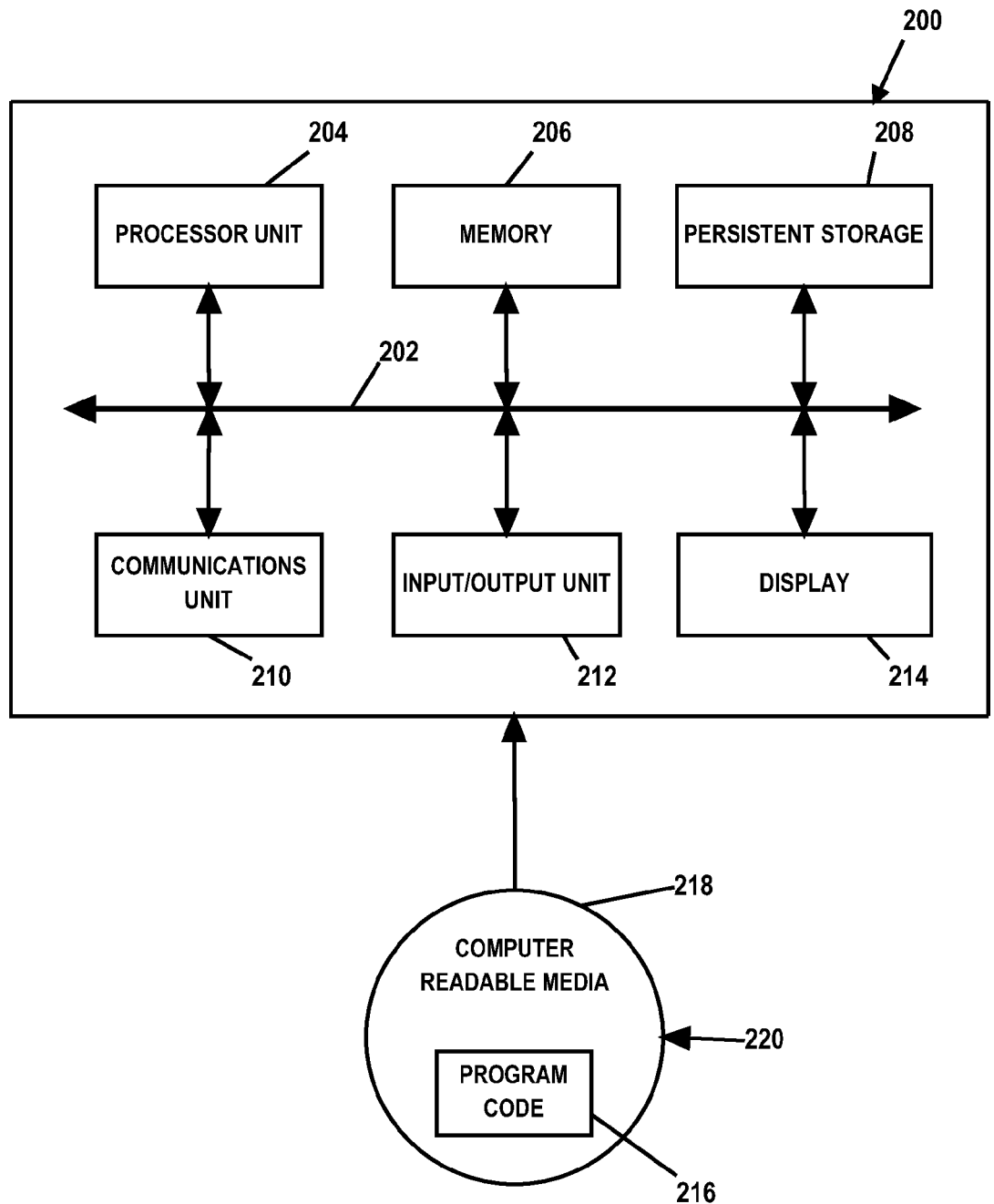
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for dynamic reconfiguration of network devices for outage prediction according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
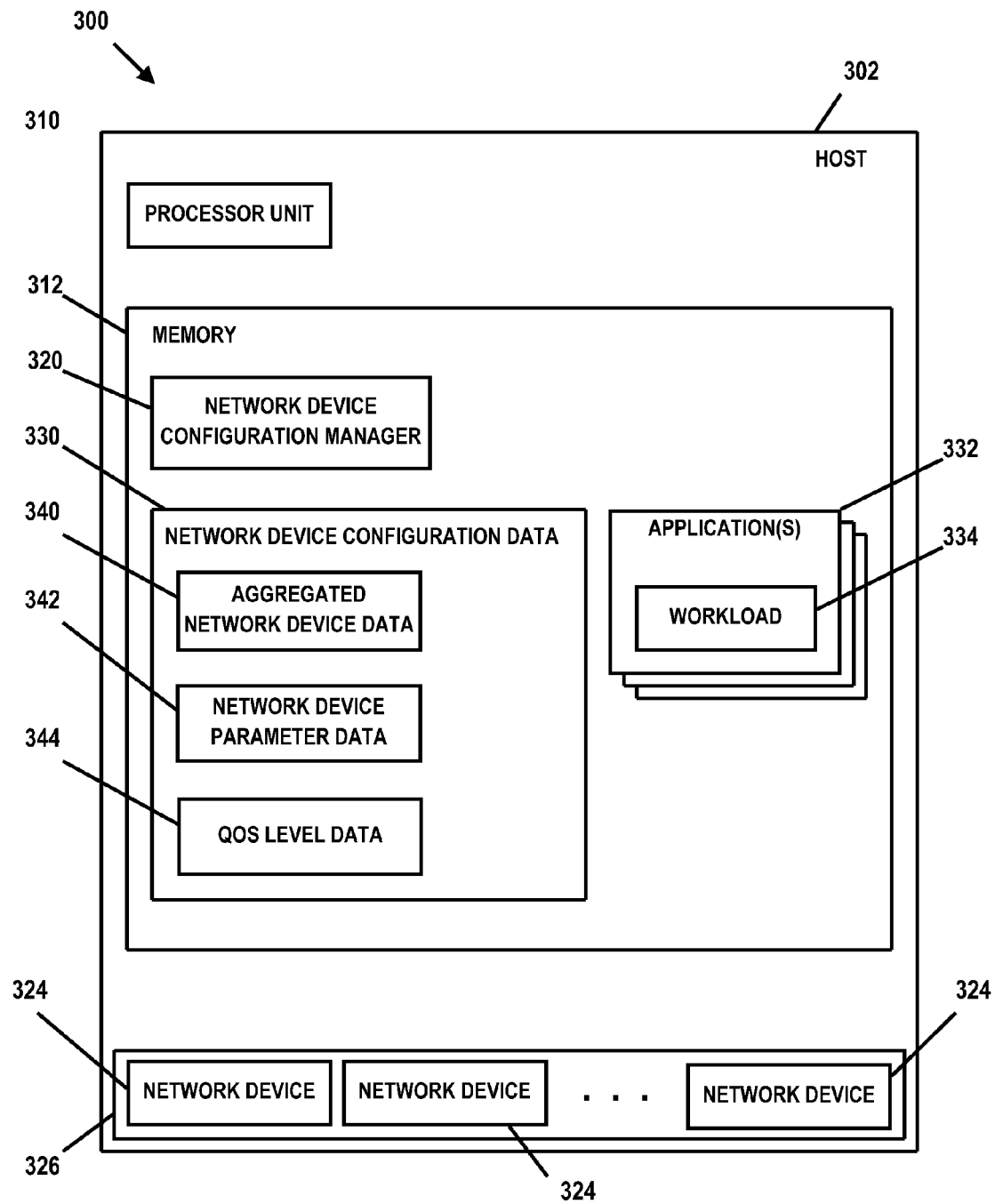
FIG. 3 is a diagram illustrating an embodiment of a computing environment in which illustrative embodiments of the present disclosure may be implemented.

FIG. 3 is a diagram illustrating a computing environment in which an embodiment of a system 300 for dynamic reconfiguration of network devices for outage prediction according to the present disclosure may be implemented. In the illustrated embodiment, system 300 includes a host 302 such as, but not limited to, client 110 and/or server 140, having a processor unit 310 and a memory 312. In FIG. 3, memory 312 includes a network device configuration manager 320 for managing and/or configuring/reconfiguring one or more network devices 324 of system 300. Network devices 324 (which may also be referred to as network adapters or input/output (I/O) adapters) are used to control the exchange of data between host 302 and another data processing system over a communications network (e.g., such as between a client and a server). In some embodiments, manager 320 may aggregate a plurality of network devices 324 (or network connections) into a link bundle 326 to increase data throughput and/or to provide redundancy in the event one or more of the network devices 324 fails or is not meeting desired/specified quality of service (QoS) levels for application data throughput. For example, in some embodiments, system 300 may be implemented in a real-time environment where real-time data communications are essential. As an example, real-time systems may include one or more applications that perform data computations that have a particular deadline or time window for completion relative to some event. In these systems, a real-time deadline may be critical to an event (e.g., such as anti-lock brakes on a car where the real-time constraint may be the time in which the brakes must be released to prevent the wheel from locking). In these systems, a real-time deadline needs to be met regardless of system load. Real time systems have stringent requirements on Quality of Service (QoS) for data I/O. A data packet that is received after the stipulated real-time window may result in a system failure. Cluster-based systems have similar real time requirements such as for heart beats, neighbor discovery, etc. Embodiments of the present disclosure are used to predict conditions in which QoS requirements may fall below some predefined and/or desired threshold. In response to the prediction of such a condition, a dynamic and/or real-time corrective action can be implemented before the actual QoS condition (outage) occurs, thereby ensuring that the real-time system requirements for I/O are maintained.

In the embodiment illustrated in FIG. 3, memory 312 also includes network device configuration data 330 and one or more applications 332. Each application 332 may have associated therewith a particular workload 334 that utilizes one or more network devices 324 for data communication/transfer. As indicated above, in some embodiments and/or applications 332, the workload 334 may be associated with real-time events and/or have time window requirements for data processing and/or transfer such that the respective workload 334 needs a particular QoS level of data I/O to meet such requirements. Network device configuration data 330 may comprise information associated with the network devices 324 managed and/or controlled by manager 320. For example, in the illustrated embodiment, data 330 includes aggregated network device data 340, network device parameter data 342, and QoS level data 344. Aggregated network device data 340 may comprise information associated with the respective network devices 324 that have been aggregated to form link bundle 326. For example, data 340 may comprise information associated with the identity of each respective network device 324 (e.g., network devices 324 that have been aggregated to form link bundle 326, spare/backup network devices, etc.), configuration settings for the respective network devices 324, etc. QoS level data 344 may comprise information associated with the QoS level for data I/O for particular applications 332/workloads 334. For example, QoS level data 344 may define and/or set a particular QoS level needed by a particular application 332/workload 334 to support particular workload 334 processing, the data I/O QoS level currently being maintained by respective network devices 324, etc. Parameter data 342 comprises information associated with various monitored parameters of the network devices 324 used by manager 320 to predict whether the QoS level of a data I/O may fall below a required/desired QoS level (e.g., below some QoS level threshold) for applications 332/workloads 334. For example, as will be described in greater detail below, parameter data 342 may comprise various operational statistics of each network device 324 that are obtained, monitored and/or evaluated by manager 320 to predict whether a particular network device 324 may experience an outage (i.e., a failure and/or data I/O throughput at a QoS level falling below a desired/needed QoS level to support workload 334 processing).

Manager 320 may be implemented in any suitable manner using known techniques that may be hardware-based, software-based, or some combination of both. For example, manager 320 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). Manager 320 is configured to monitor and/or analyze various parameters/attributes of network devices 324 and dynamically reconfigure such network devices 324 and/or the aggregated link bundle 326 transparently to a user and/or workload(s) 334 which are using the network device(s) 324 to maintain a certain QoS level for associated workloads 334. For example, in some embodiments, manager 320 may dynamically remove/replace network devices 324 of the link bundle 326, dynamically switch data communications over to another network device 324 of the link bundle 326 for certain workloads 332, etc. Manager 320 may also remove a particular network device 324 from link bundle 326, dynamically reconfigure the particular network device 324 (e.g., reconfigure the particular network device 324 to handle the QoS level needed by the application 332/workload 334), and return the reconfigured network device 324 to link bundle 326.

Figure 4:
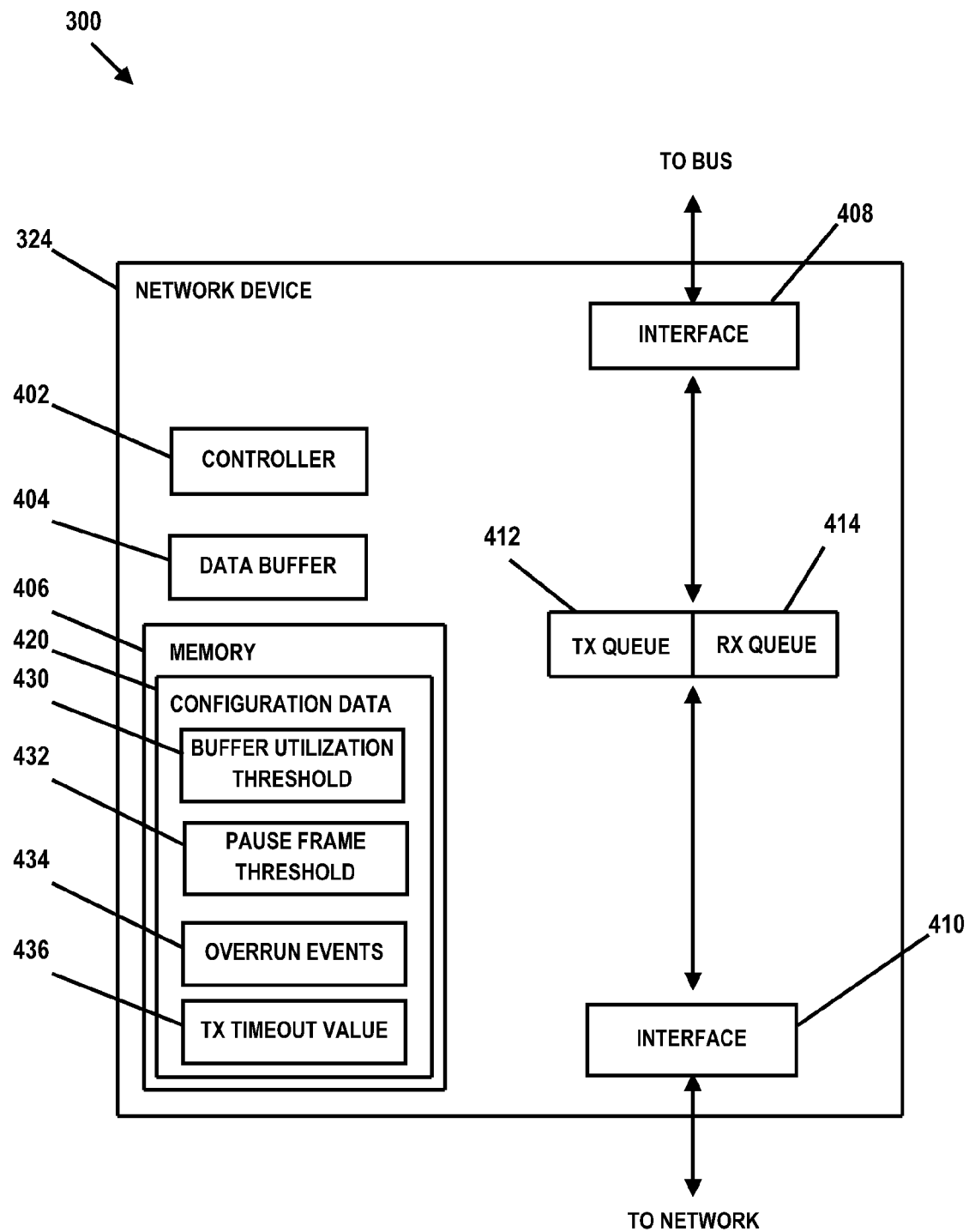
FIG. 4 is a diagram illustrating an embodiment of a network device of the system illustrated in FIG. 3 according to the present disclosure.

FIG. 4 is a diagram illustrating an embodiment of a network device 326 of system 300 according to the present disclosure. In the embodiment illustrated in FIG. 4, network device 324 includes a controller 402, a data buffer 404, a memory 406, interfaces 408 and 410, a transmit (Tx) queue 412, and a receive (Rx) queue 414. The particular components of device 324 may vary based on the type of I/O adapter. Interfaces 408 and 410 provide a path/interface between a network connected to host 302. Data buffer 404 is used to store data being transmitted and received through network device 324. Controller 402 is used to control the various processes/functions performed by network device 324. Controller 402 may comprise a processor, and application-specific integrated chip (ASIC) or other type of processing component. Controller 402 is used to manage the flow of data and perform various processes/functions that may be defined and/or otherwise stored as instructions in memory 406. It should be understood that instructions and other information described hereinbelow associated with memory 406 may also and/or alternatively be stored external to device 324. Transmit and receive queues 412 and 414 are used to queue work requests. Each work request may point to data buffer 404 containing packets to be transmitted in case of transmit queue 412 or buffer an address where incoming packets can be copied in case of receive queue 414.

In the embodiment illustrated in FIG. 4, memory 406 includes configuration data 420 for the respective network device 324. Configuration data 420 may comprise information associated with instructions for carrying out various process/functions of network device 324 and/or various parameters/attributes that may be logged/monitored by the respective network device 324 (e.g., a driver of the network device 324). For example, in the illustrated embodiment, configuration data 420 includes a buffer utilization threshold 430, a pause frame threshold 432, overrun event(s) 434 and a transmit (TX) timeout value 436. Buffer utilization threshold 430 may comprise a threshold of utilization of data buffer 404 such that if data buffer 404 utilization reaches and/or exceeds threshold 430, manager 320 considers such an indication as a prediction that the QoS level of data throughput for a particular network device 324 may fall below a desired/required QoS level. Data buffer 404 utilization monitoring may be performed using a memory tracking mechanism. The threshold 430 can be configured by a network administrator based on the type of network device 324. In this example, when data packets are queued, a queue length can be checked, and if the length meets or exceeds threshold 430, data buffer 404 utilization of that network device 324 can be marked as high, thereby indicating an impending outage.

Pause frame threshold 432 may comprise a threshold of pause frame issuances such that if the quantity of pause frame issuances reaches and/or exceeds threshold 432, manager 320 considers such an indication as a prediction that the QoS level of data throughput for the network device 324 may fall below a desired/required QoS level. Pause frames are sent out by a network device when the device is unable to handle the rate of incoming packets. The quantity of pause frames generated by a network device (overall or a rate of pause frame issuances over a certain period of time) may be evaluated as an indication of an impending outage. A value for threshold 432 may be set by a network administrator based on the expected throughput of the network device. If the rate of pause frames is found to meet or exceed threshold 432, manager 320 considers such an indication as a prediction that the QoS level of data throughput for the network device 324 may fall below a desired/required QoS level.

Overrun event(s) 434 may comprise information associated with direct memory access (DMA) overrun errors. Manager 320 uses information associated with overrun events as an indication that the network device may be running out of incoming memory. In some embodiments, overrun events 434 may include a timer value that is set in order to identify the frequency at which a corresponding DMA overrun event counter value is read, which may be based on the data throughput QoS level needed from the network device 324 to support application 332/workload 334 processing. In some embodiments, the quantity of overrun events is monitored by querying the network device 324 (e.g., by manager 320). In some embodiments, one or more overrun events 434 may be considered by manager 320 as an indicating of an impending outage.

Transmit timeout value 436 may comprise a time value associated with the transmission of data packets. For example, a transmit timeout is a condition in which the network device 324 has not processed outgoing packets within a predefined timeout value 436. TX queue 412 indices may be used to identify this condition. Manager 320 monitors the transmission of data packets within value 436 such that if the transmission of packets meets and/or exceeds value 436, manager 320 considers such an event as an indication of an impending outage.

Thresholds 430 and 432, events 434 and/or the transmission of packets by network device 324 within timeout value 436 may be logged and/or monitored by controller (e.g., and reported to manager 320) and/or logged/monitored by manager 320. Manager 320 may handle a predicted/impending outage according to one or more policies as set forth by a system administrator or other user. For example, in some embodiments, in response to predicting an outage or a data throughput QoS level that may fall below a desired/required QoS level, manager 320 may take the network device 324 out of link bundle 326 (e.g., resulting in the data corresponding to one or more workloads 334 being transferred/diverted to one or more different network devices 324), the network device 324 may be removed from link bundle 326 and an alert sent to the administrator, and/or if the number of predicted outages meets or exceeds some predefined a limit, a partition migration could be initiated to another system altogether (e.g., movement of a workload and/or workload partition to another host). Manager 320 may also perform corrective actions on the particular network device 324 that is predicted for an impending outage. After the corrective action is taken, the network device 324 can be added back into the aggregated link bundle 326. As an example, a particular network device 324 can be dynamically removed from the link bundle 326 by manager 320 and reconfigured such that the network device 324 can handle the QoS level requirement of the system/workload. For example, TX queue 412 size can be incrementally increased as a part of the reconfiguration to prevent egress packet buffering in software. Once the network device 324 is reconfigured to prevent the predicted outage, it can be dynamically added back to the link bundle 326 and data traffic may be rerouted to the reconfigured network device 324.

In some embodiments, manager 320 may be configured to dynamically reconfigure link bundle 326 and/or particular network devices 324 as the I/O load increases or decreases, thereby reducing the resource requirements of I/O network devices 324 as the I/O load decreases. For example, if system 300 is very I/O intensive during certain period of the day and less so during other times, manager 320 can provision less I/O resources (e.g., network devices 324) during less I/O intensive time periods. In response to an increase in I/O load, manager 320 may dynamically reconfigure link bundle 326 and/or particular network devices 324 (e.g., allocates more resources and/or reconfigures network devices 324 for the increased I/O load) such that the application 332/workload 334 QoS level requirements are met. In response to a reduction in I/O load, manager 320 may dynamically release the additional resources previously allocated (which can then be reused for other purposes).

Figure 5:
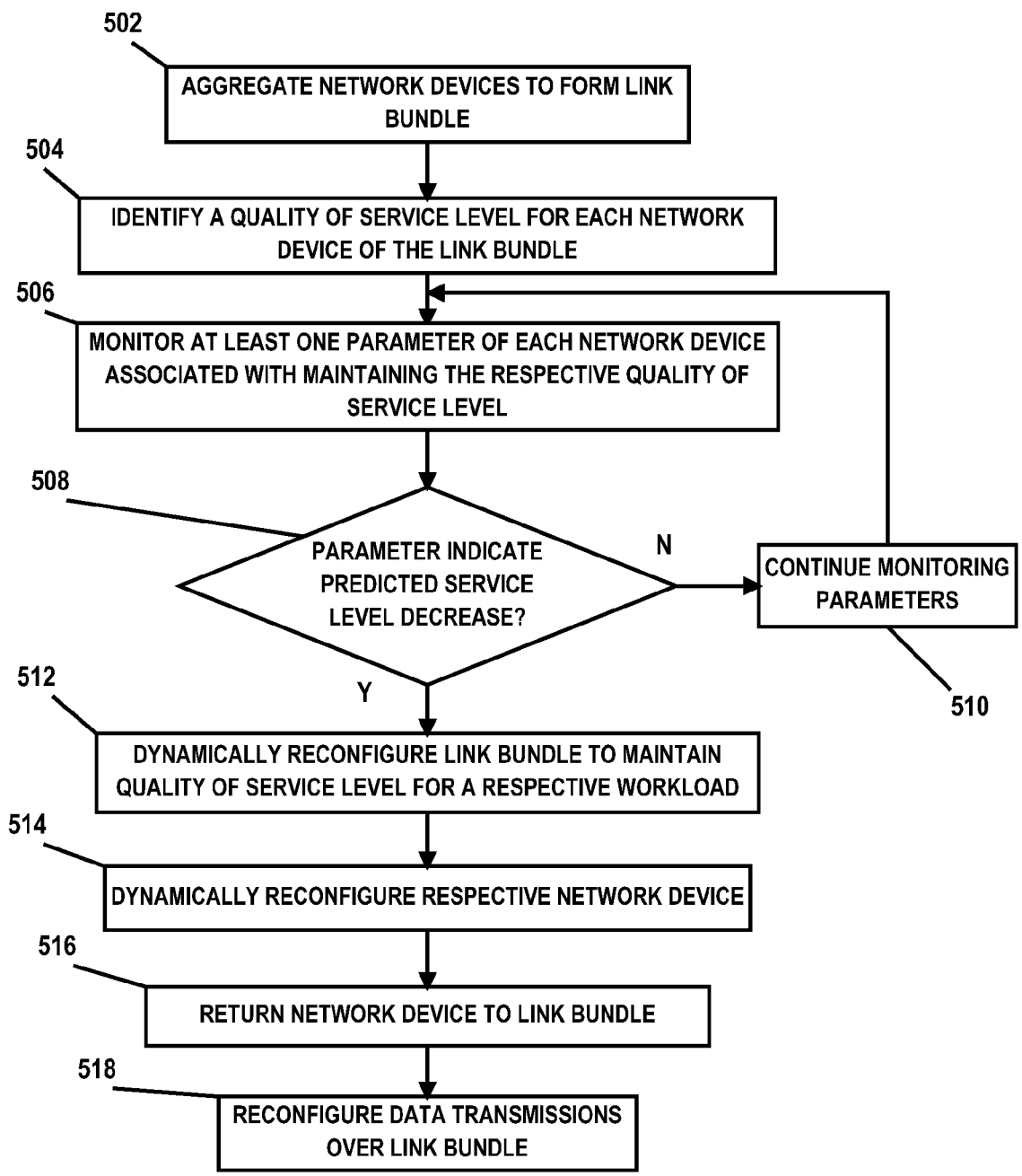
FIG. 5 is a flow diagram illustrating an embodiment of a method for dynamic reconfiguration of network devices for outage prediction according to the present disclosure.

FIG. 5 is a flow diagram illustrating an embodiment of a method for dynamic reconfiguration of network devices for outage prediction according to the present disclosure. The method begins at block 502, where manager 320 aggregates network devices 324 into a link bundle 326. At block 504, manager 320 may identify a QoS level associated with particular applications 332/workloads 334 utilizing network devices 324 of the link bundle 326 (e.g., as set forth by a system administrator, dictated by applications workloads 334, or otherwise defined). At block 506, manager 320 monitors and analyzes one or more operational parameters/attributes of each of the bundled network devices 324. At decisional block 508, a determination is made whether the monitored parameter indicates a predicted QoS level decrease for the respective network device 324 below the QoS level needed by the respective application(s) 332/workload(s) 334 utilizing the respective network device 324. If not, the method proceeds to block 510, where manager 320 continues monitoring the operating parameters of the network devices 324. If at decisional block 508 it is determined that the monitored parameter indicates a predicted data throughput QoS level decrease by the respective network device 324 below the QoS level needed by the application(s) 332/workload(s) 334 utilizing the respective network device 324, the method proceeds to block 510.

At block 510, manager 320 dynamically reconfigures the link bundle 326. For example, manager 320 may remove the respective network device 324 from link bundle 326 before the QoS level decreases below the QoS level needed (e.g., prior to an actual outage), divert workload 334 traffic to another network device, etc. At block 512, manager 320 may dynamically reconfigure the respective network device 324 to address/correct the parameter that is affecting the QoS level. For example, manager 320 may increase queue sizes or perform other actions to remedy the corresponding operational characteristic(s) of the affected network device 324. At block 514, in response to reconfiguring the network device 324, manager 320 may return the reconfigured network device 324 to the link bundle 326. At block 516, manager 320 may reconfigure data transmission over the link bundle 326 based on the returned network device 324 (e.g., adjusting data transmissions to the various network devices 324 of the link bundle 326).

Thus, embodiments of the present disclosure enable dynamic and/or real-time reconfiguration of network devices and/or an aggregated link bundle before the occurrence of an outage/event that may cause the QoS level of data throughput by the network device to decrease below a level needed to support system/application requirements. For example, in some embodiments, one or more operating attributes/parameters of each of the bundled network devices is monitored and/or analyzed to determine whether the attribute/parameter value indicates an impending outage/QoS level decrease. If so, the link bundle and/or respective network device may be reconfigured dynamically and/or in real-time before such outage/QoS level decrease occurs.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
   aggregating a plurality of network devices to form an input/output (I/O) link bundle;
   identifying a quality of service level of data throughput needed by at least one workload utilizing the I/O link bundle;
   monitoring a parameter of each of the network devices of the I/O link bundle;
   determining whether the monitored parameter indicates a predicted data throughput quality of service level decrease by a network device being utilized by the workload below the quality of service level for the workload; and
   responsive to determining that the monitored parameter indicates a predicted quality of service level decrease by the respective network device, dynamically reconfiguring the link bundle to maintain the quality of service level for the workload utilizing the I/O link bundle.

2. The method of claim 1, wherein monitoring the parameter comprises monitoring a rate of pause frames issued by the network device, and further comprising, in response to the rate of pause frames issued exceeding a threshold value, dynamically reconfiguring the link bundle.

3. The method of claim 1, wherein monitoring the parameter comprises monitoring buffer utilization by the network device, and further comprising, in response to the buffer utilization exceeding a threshold value, dynamically reconfiguring the link bundle.

4. The method of claim 1, wherein monitoring the parameter comprises monitoring overrun error events by the network device, and further comprising, in response to a quantity of overrun error events exceeding a threshold value, dynamically reconfiguring the link bundle.

5. The method of claim 1, wherein monitoring the parameter comprises monitoring a transmit timeout parameter for transmitting outgoing data packets by the network device, and further comprising, in response to transmission of outgoing data packets by the network device exceeding the transmit timeout parameter, dynamically reconfiguring the link bundle.

6. The method of claim 1, wherein reconfiguring the link bundle comprises switching the workload to another network device.

7. The method of claim 1, wherein reconfiguring the link bundle comprises:
   removing the network device from the link bundle;
   dynamically reconfiguring the network device to modify at least one characteristic of the network device affecting the parameter; and
   replacing the reconfigured network device into the link bundle.

* * * * *